United States Patent [19]

Roggero et al.

[11] Patent Number: 4,734,461
[45] Date of Patent: Mar. 29, 1988

[54] METHOD FOR THE TERMINATION OF POLYMERS OBTAINED BY THE ANIONIC POLYMERIZATION OF DIENIC AND/OR VINYLAROMATIC MONOMERS, AND COMPOUNDS SUITABLE TO THAT PURPOSE

[75] Inventors: Arnaldo Roggero, San Donato Milanese; Alberto Gandini, Milan, both of Italy

[73] Assignee: Eniricerche S.p.A., Milan, Italy

[21] Appl. No.: 877,016

[22] Filed: Jun. 20, 1986

[30] Foreign Application Priority Data

Jul. 1, 1985 [IT] Italy ............................ 21372 A/85

[51] Int. Cl.$^4$ .................................................. C08F 8/30
[52] U.S. Cl. ...................................... 525/293; 526/83
[58] Field of Search ........................... 525/293; 526/83

[56] References Cited

U.S. PATENT DOCUMENTS

| | | | |
|---|---|---|---|
| 2,616,875 | 11/1952 | Adams et al. | 526/83 |
| 3,402,138 | 9/1968 | Albert et al. | 526/83 |
| 3,402,162 | 9/1968 | Strobel | 526/83 |
| 3,668,279 | 6/1972 | Loveless et al. | 526/83 |
| 3,763,126 | 10/1973 | Farrar | 526/83 |
| 3,806,712 | 4/1974 | Hart | 526/83 |
| 3,878,181 | 4/1975 | Mayer-Maden et al. | 526/83 |
| 3,892,819 | 7/1975 | Najvar | 525/119 |
| 4,314,043 | 2/1982 | Kojima et al. | 525/103 |
| 4,340,685 | 7/1982 | Takeuchi et al. | 525/247 |
| 4,618,449 | 10/1986 | Roggero et al. | 526/83 |

Primary Examiner—Joseph L. Schofer
Assistant Examiner—Bernard Lipman
Attorney, Agent, or Firm—Hedman, Gibson, Costigan & Hoare

[57] ABSTRACT

Coupling agents of general formula

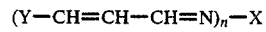

and/or

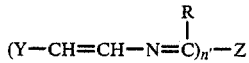

and their use in a method for the termination of living polymers obtained by the anionic polymerization of dienic and/or vinylaromatic monomers.

6 Claims, No Drawings

METHOD FOR THE TERMINATION OF POLYMERS OBTAINED BY THE ANIONIC POLYMERIZATION OF DIENIC AND/OR VINYLAROMATIC MONOMERS, AND COMPOUNDS SUITABLE TO THAT PURPOSE

The anionic polymerization, if carried out under proper conditions and starting from suitable monomers (M. SZWARC, Carbanions, Living Polymers and El. Transfer Processes, Interscience Publishers, J. Wiley and Sons, New York, 1968), allows living polymers to be obtained, which are well fit for suitable transformations. Among these, the reaction of coupling (uniting two or more polymeric segments through a linking agent to yield a polymer having molecular weight nPM, wherein PM is the molecular weight of the polymeric segment and n is the functionality of the linking agent) is certainly one of the most investigated processes, because it allows, by a simple approach, important changes to be obtained also in terms of properties of the polymers processed.

For example, in case of polymerization of dienes, by this way increasing Mooney viscosity, reducing the "cold flow", increasing the "green tensile strength" and even succeeding in modifying the molecular weight as desired is possible.

In case then of the synthesis of block polymers constituted by linear or branched couplings of A-B elements (wherein A is an aromatic polyvinyl and/or polyisopropenyl sequence and B is a dienic sequence, also hydrogenated), the use of efficient coupling agents becomes a factor of basic importance because, as known, the possible presence of unreacted A-B products in the end product impairs the technological properties of the same.

In the technical literature, numerous examples are reported of coupling agents [H. L. HSIEH, Rubber Chem. and Tech. 49 (5), 1305 (1976)].

We have found now that the hereunder exemplified compounds can be conveniently used as new coupling agents, because, besides the properties typical of the best coupling agents described in technical literature (cfr. H. L. Hsieh, ibid.), they show the following advantages:

(i) the coupling reaction can be accomplished without the use of activators;

(ii) the coupling reaction can be accomplished at a temperature lower than that normally used for the traditional coupling agents, with the reaction time being the same;

(iii) no side products are formed, because the coupling reaction is an addition, and not a removal reaction. The products which we found to be efficient coupling agents are comprised within the following general formula:

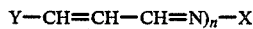

and/or

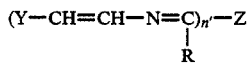

wherein:
X=aryl, condensed aryl, aryl isolated by a heteroatom or by an alkenyl group, alkyl with a number of C atoms comprised between 2 and 20, cycloalkyl, alkylcycloalkyl, radical with heteroatom; all these groups possibly containing a functional group of vinylaromatic, ester, aldehydic, ketonic, cyano type, and so forth;

Y=aryl, cycloalkyl, alkyl, alkylaryl, alkylcycloalkyl, possibly containing a functional group of vinylaromatic, ester, aldehydic, ketonic, cyano type, and so forth;

n=an integer, comprised within the range of from 1 to 4;

n'=an integer, comprised within the range of from 1 to 4;

R=H or alkyl group, but preferably H;

Z=Aryl, alkyl, cycloalkyl, possibly containing a functional group of vinylaromatic, ester, aldehydic, ketonic, cyano type, etc.

Such coupling agents can be prepared in an easy way, and with yields in many cases can be quantitative, according to the following procedure:

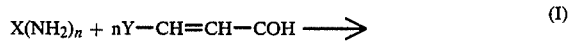

(I)

(II)

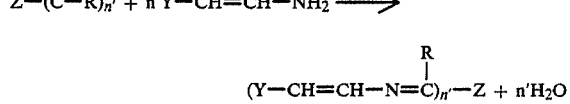

with the water formed being removed by azeotropic distillation with a suitable solvent.

Non limitative examples of the aminic compounds used, possibly containing a functional group selected among those simplified hereinabove (vinylaromatic, ester, cyano, aldehydic, ketonic, and so forth) [see radical X] are: aminostilbene, methyl aminobenzoate, aminobenzonitrile, aminobenzophenone, butylamine, aniline, cyclohexyl amine, p.phenylenediamine, 1,5-diaminonaphthalene, 1,6-diaminohexane, 2,6-diaminopyridine, 4,4'-diaminodiphenylether, 4,4'diaminodiphenyl, 1,4,5,8-tetraaminonaphthalene, 3,3'-diaminobenzidine.

Non limitative examples of compounds of unsaturated aldehydic type [see radical Y] possibly containing at least one functional group among those hereinabove indicated are: 4-cyanocinnamaldehyde, 4-carboxymethylcinnamaldehyde, cinnamaldehyde, crotonaldehyde, and so forth . . .

In the synthesis of compounds (I), at least one functional group among those listed above must be present in radical X, or in radical Y, on in both of them.

Non limitative examples of aldehydic and/or ketonic compounds [see radical Z] possibly containing at least one functional group among these mentioned above are: methyl 4-formylbenzoate, methyl 4-acetylbenzoate, 4-cyanobenzaldehyde, 4-formylstilbene, benzaldehyde, cyclohexanaldehyde, p-diacetylbenzene, o-, m- and p-phthalaldehyde, tetramethylenedialdehyde.

Non limitative examples of unsaturated aminic compounds possibly containing at least one of the above mentioned functional groups are: ethenamine-2-phenyl-4'-carbomethoxy, ethenamine-2-phenyl-4'-cyano, ethenamine-2-phenyl, ethenamine-2-alkyl.

In the synthesis of compounds (II), at least one functional group among those reported above must be present in radical Z or in radical Y, or in both of them.

The compounds of the present patent application can be used in processes for the polymerization of monomers susceptible of anionic initiation under livingness conditions, and in particular for the polymerization of dienic and/or vinylaromatic monomers.

The conjugated dienes used contain from 4 to 12, and preferably from 4 to 8 carbon atoms.

Such monomers comprise: 1,3-butadiene, isoprene, 2,3-dimethylbutadiene, piperylene, 3-butyl-1,3-octadiene and 2-phenyl-1,3-butadiene.

The vinylaromatic monomers contain from 8 to 20, and preferably from 8 to 14 carbon atoms. Typical examples are: styrene, α-methylstyrene, 1-vinylnaphthalene, 2-vinylnaphthalene, 2-isopropenylnaphthalene, p-phenylstyrene, 3-methylstyrene, α-methyl-p-methylstyrene and p-cyclohexylstyrene.

The conjugated dienes and/or the vinylaromatic monomers can be polymerized either alone or in mixture or sequentially, to form homopolymers, random copolymers and block copolymers.

The polymerization is carried out in solution at temperatures comprised within the range of from −100° to +200° C. and preferably of from 0° to 100° C., and under a pressure which is the presence of the system under the temperature conditions used; however, higher or lower pressures are not contraindicated.

Suitable solvents comprise paraffinic, cycloparaffinic and aromatic hydrocarbons. Typical examples are cyclohexane, hexane, pentane, heptane, isooctane, benzene, toluene and mixtures thereof.

As known, small amounts of polar compounds can be added to the solvent to the purpose of obtaining, in the polymerization of diene, a 1,2-configuration, or of increasing the efficiency of the initiator in case of polymerization of vinylaromatic monomers.

The initiators are the typical anionic initiators normally used to this purpose.

Preferably, the organometallic compounds of formula R-Me are used, wherein R is an aliphatic, cycloaliphatic or aromatic hydrocarbon radical and Me is an alkali metal, preferably lithium.

The amount of initiator used is related to the molecular weight of the polymer which one wishes to obtain. The polymerization is carried out under such conditions as to secure the livingness of the polymer obtained (M. SZWARC, Carbanions, Living Polymers and El. Transfer Processes, Interscience Publishers, J. Wiley & Sons, New York, 1968).

The coupling agent can be introduced into the reaction medium by any way, either by one single addition, or by a portionwise addition and at the desired time.

Preferably, it is introduced at the end of the polymerization, in the desired amount.

The molar amount of coupling agent ($m_{AC}$) to be added is given by the formula:

$$m_{AC} = m_{CA}/f_{AC}$$

wherein $m_{CA}$ = mol of active centres of living polymer and $f_{AC}$ = functionality of the coupling agent (besides the presence of reactive groups —CH=N—, also other additional functional groups exist).

The amount used of coupling agent conditions the coupling yields: obviously, a stoichometric ratio of polymer active centre to coupling agent active centre (by taking into account the functionality thereof) favours the highest yield.

The temperature at which the "coupling" reaction is carried out depends on the type of agent used, on the type of polymer submitted to the reaction, and on other factors, e.g., on the reaction medium: it can vary generally within the range of from 20° to 150° C., but the reaction is preferably carried out between 40° and 80° C.

The contact times are comprised within the range of from some minutes to some hours: preferably, times comprised within the range of from 10 minutes to 2 hours are used.

Sometimes, also polar activators, which improve the coupling rate, can be used: in the case of the most active coupling compounds herein claimed, the use of these activators is not required.

The solvents are those used in the polymerization.

The coupling reaction is carried out under a pressure which is the pressure of the system at the temperature at which the reaction is carried out, but higher or lower pressures are not contraindicated.

EXAMPLE 1

The polymerization and coupling are carried out inside a reactor of 1 liter of capacity, equipped with stirrer, pressure gauge, thermocouple sheath and inlet way for the reactants and the inert gas.

In the order, 500 cm³ of anhydrous cyclohexane, 12 g of styrene and 1,5 mmol of Li-sec.butyl are charged, leaving to polymerize at 60° C. for about 1 hour. At the end, 30 g of butadiene is introduced and the reaction is complete at 60° C. within 1 hour. A very small aliquot of this polymer is isolated and submitted to the various analyses. At 60° C., 0.375 mmol is then injected of a solution in cyclohexane of methyl-N-[cinnamylidene]p-aminobenzoate.

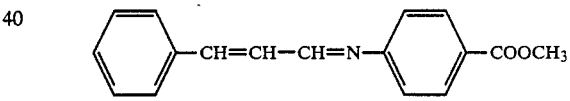

15 minutes later the polymer, after the addition of 1 g of antioxidizer, is coagulated with an excess of methanol, 42 g being obtained of a product which is dried at 60° C. for 15 hours under vacuum.

The properties of the polymers before and after the coupling reaction are reported in Table 1.

TABLE 1

| Sample | Composition[a] % by weight | | Molecular Weight[b] g/mol | Gel | Coupling Efficiency[c] |
|---|---|---|---|---|---|
| | STY | BUT | $\overline{M}_p$ | % | % |
| A-B | 28.5 | 71.5 | 35000 | 0 | — |
| A-B-A | 28.5 | 71.5 | 135000 | 0 | >>95 |

NOTES:
[a] via N.M.R.;
[b] $\overline{M}_p$ = peak molecular weight;
[c] as the ratio of the area, via G.P.C., of the peak of polymer after the coupling reaction (A-B-A), to the area of the peak of polymer before coupling (A-B).

The polymer A-B-A of Example 1 has the following technological properties:
Elongation: 910%
Ultimate Tensile Strength: 30.6 MPa
whilst the corresponding polymer A-B, with the elongation being the same, shows an ultimate tensile strength of about 3 MPa.

If, instead of methyl-N-[cinnamylidene]p-aminobenzoate, the coupling agent dichlorodiphenylsilane is used, under the same experimental conditions, the coupling efficiency is lower than 10%.

EXAMPLE 2

The test 1 is repeated, with the only variant that p-benzoyl-aniline-N[cinnamylidene] (0.45 mmol) is used, and polymers (A-B and A-B-A) having the properties shown in Table 2 are isolated.

TABLE 2

| Sample | Composition$^a$ % by weight | | Molecular Weight$^b$ g/mol | Gel | Coupling Efficiency$^c$ |
|---|---|---|---|---|---|
| | STY | BUT | $\overline{M_p}$ | % | % |
| A-B | 29 | 71 | 37000 | 0 | — |
| A-B-A | 29 | 71 | 107000 | 0 | ≃95 |

NOTES:
see Table 1.

EXAMPLE 3

Into the reactor described at Example 1, 50 g of α-methylstyrene and 1.5 mmol of Li-sec.butyl are charged, the polymerization being carried out at 20° C. for 1 hour and 15 minutes. At the end, 5 g of butadiene is added, it being let interact for 15 minutes, and subsequently 500 cm$^3$ of cyclohexane with 25 g of butadiene is added, making polymerize at 60° C. for 1 hour. A small sample is drawn, and 0.375 mmol of methyl-N-[cinnamylidene]p-aminobenzoate is then injected, the coupling reaction being carried out at the temperature of 60° C. for 15 minutes. In the usual way a polymer (43 g) is isolated, which has the properties described in Table 3, wherein also the properties of product A-B are reported.

TABLE 3

| Sample | Composition$^a$ % by weight | | Molecular Weight$^b$ g/mol | Gel | Coupling Efficiency$^c$ |
|---|---|---|---|---|---|
| | α-MeSTY | BUT | $\overline{M_p}$ | % | % |
| A-B | 30 | 70 | 36000 | 0 | — |
| A-B-A | 30 | 70 | 136000 | 0 | ≃90 |

NOTES:
see Table 1.

EXAMPLE 4

The test 1 is repeated, with the only difference that as the coupling agent, 4-carbomethoxy-cynnamaldehyde-anilido

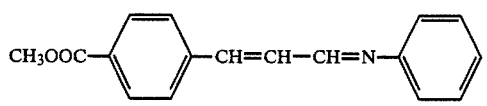

is used.

TABLE 4

| Sample | Composition$^a$ % by weight | | Molecular Weight$^b$ g/mol | Gel | Coupling Efficiency$^c$ |
|---|---|---|---|---|---|
| | STY | BUT | $\overline{M_p}$ | % | % |
| A-B | 28.7 | 71.3 | 39000 | 0 | — |
| A-B-A | 28.7 | 71.3 | 151000 | 0 | ≃95 |

NOTES:
see Table 1.

EXAMPLE 5

The polymerization test is carried out as described at Example 1, but as the coupling agent, 1,6-diaminohexane-N,N'-bis[cinnamylidene-(4'-carbomethoxy)] (0.25 mmol)

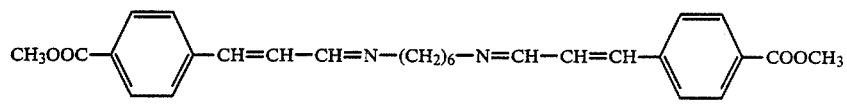

is used.

The data relevant to the polymers isolated is shown in the following Table.

TABLE 5

| Sample | Composition$^a$ % by weight | | Molecular Weight$^b$ g/mol | Gel | Coupling Efficiency$^c$ |
|---|---|---|---|---|---|
| | STY | BUT | $\overline{M_p}$ | % | % |
| A-B | 29 | 71 | 36000 | 0 | — |
| A-B-A | 29 | 71 | 210000 | 0 | >95 |

NOTES:
see Table 1.

EXAMPLE 6

The test is carried out as in Example 1, but instead of butadiene, isoprene is polymerized. As the coupling agent, ethenamine-2-phenyl-N-[benzylidene-4'-(carbomethoxy)]

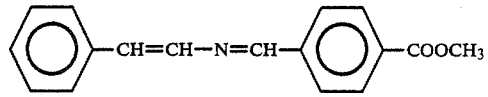

is used.

The data relevant to the polymer isolated (≃42 g) and to the corresponding product A-B is shown hereunder.

TABLE 6

| Sample | Composition$^a$ % by weight | | Molecular Weight$^b$ g/mol | Gel | Coupling Efficiency$^c$ |
|---|---|---|---|---|---|
| | STY | BUT | $\overline{M_p}$ | % | % |
| A-B | 28.5 | 71.5 | 34000 | 0 | — |
| A-B-A | 28.5 | 71.5 | 124000 | 0 | ≃90 |

NOTES:
see Table 1.

EXAMPLE 7

In the same equipment as of the above tests, 40 g of butadiene is polymerized at 60° C. for 1 hour, with 1.5 mmol of Li-sec.butyl in 400 cm$^3$ of cyclohexane. At the end, a mixture of methyl-N-[cinnamylidene]p-aminobenzoate (0.2 mmol) and 1,6-diaminohexane-N,N'-bis[cinnamylidene-(4'-carbomethoxy)] (0.1 mmol)

is added, the mixture being let react 15 minutes at 60° C. The G.P.C. chart of the polymer isolated shows the presence of peaks of products having different coupling degrees, and with a distribution of molecular weight broader than of polymer A-B.

We claim:

1. A process for the termination of living macroanions obtained by the anionic polymerization or copolymerization of diene monomers or vinylaromatic monomers or mixtures thereof comprising introducing into the polymerization mixture either batchwise or incrementally, a coupling agent selected from the group consisting of methyl-N[cinnamylidene]-p.amminobenzoate; p.benzoylaniline-N-[cinnamylidene]; 4-carbomethoxy-cinnamaldehyde-anilido; 1,6-diaminohexane,N,N'-bis-[cinnamylidene-(4'carbomethoxy]; and ethenamine-2-phenyl-N-[benzylidene-4' (carbomethoxy)].

2. The process of claim 1 further comprising conducting the termination reaction in the presence of a polar compound capable of enhancing the coupling rate of said coupling agent.

3. The process of claim 1 wherein the termination reaction is conducted at a temperature of from 20° to 150° C.

4. The process of claim 3 wherein the termination reaction is conducted at a temperature of from 40° to 80° C.

5. The process of claim 1 wherein the amount of the coupling agent ($^m$AC) added to the polymerization mixture corresponds to the formula:

$$m_{AC} = m_{CA}/f_{AC}$$

wherein $m_{CA}$ is the number of moles of the active centers of the polymer and $f_{AC}$ is the functionality of the coupling agent.

6. The process of claim 1 wherein the termination reaction is conducted in the presence of a solvent selected from paraffinic compounds, cycloparaffinic compounds and aromatic hydrocarbons.

* * * * *